US009862645B2

(12) United States Patent
Jansen et al.

(10) Patent No.: US 9,862,645 B2
(45) Date of Patent: Jan. 9, 2018

(54) FIREPROOF PRODUCT CONTAINING GRAPHITE, METHOD FOR PRODUCING SAID PRODUCT, AND USE OF SAID PRODUCT

(71) Applicant: Refratechnik Holding GmbH, Ismaning (DE)

(72) Inventors: Helge Jansen, Friedland (DE); Christos Aneziris, Freiberg (DE); Petra Stein, Goettingen (DE)

(73) Assignee: Refratechnik Holding GmbH, Ismaning (DE)

( * ) Notice: Subject to any disclaimer, the term of this patent is extended or adjusted under 35 U.S.C. 154(b) by 0 days.

(21) Appl. No.: 14/892,669

(22) PCT Filed: Apr. 30, 2014

(86) PCT No.: PCT/EP2014/058854
§ 371 (c)(1),
(2) Date: Nov. 20, 2015

(87) PCT Pub. No.: WO2014/187653
PCT Pub. Date: Nov. 27, 2014

(65) Prior Publication Data
US 2016/0122248 A1  May 5, 2016

(30) Foreign Application Priority Data
May 23, 2013  (DE) .......................... 10 2013 008 855

(51) Int. Cl.
C04B 35/52    (2006.01)
C04B 35/01    (2006.01)
C04B 35/043   (2006.01)

(52) U.S. Cl.
CPC .......... C04B 35/013 (2013.01); C04B 35/043 (2013.01); *C04B 2235/425* (2013.01);
(Continued)

(58) Field of Classification Search
CPC ..... C04B 35/52; C04B 35/522; C04B 35/536; C04B 2235/422
(Continued)

(56) References Cited

U.S. PATENT DOCUMENTS 3,001,237 A * 9/1961 Balaguer ............... C04B 35/532
252/502
4,539,301 A * 9/1985 Kaneko .................. B22D 41/02
501/99
(Continued)

FOREIGN PATENT DOCUMENTS

CN    102858712 A    1/2013
FR    2 542 309 A1    9/1984
(Continued)

OTHER PUBLICATIONS

DIN EN 993-19, Methods of test for dense shaped refractory products, Part 19: Determination of thermal expansion by a differential method, Aug. 2004, 12 pages.
(Continued)

*Primary Examiner* — Noah Wiese
(74) *Attorney, Agent, or Firm* — Collard & Roe, P.C.

(57) ABSTRACT

A molded, fireproof product, which contains graphite, in particular natural graphite, and is based on fireproof granular materials. The granular-material grains of the product are consolidated to form a molded body by means of a binder known per se and/or ceramic bonding. The product has a homogeneous mixture of at least two graphite types, which each have a different coefficient of thermal expansion. One graphite type is predominant by amount and the other graphite type acts as an auxiliary graphite type. The invention further relates to a method for producing a product and to the use of the product.

25 Claims, 2 Drawing Sheets

Figure 1:
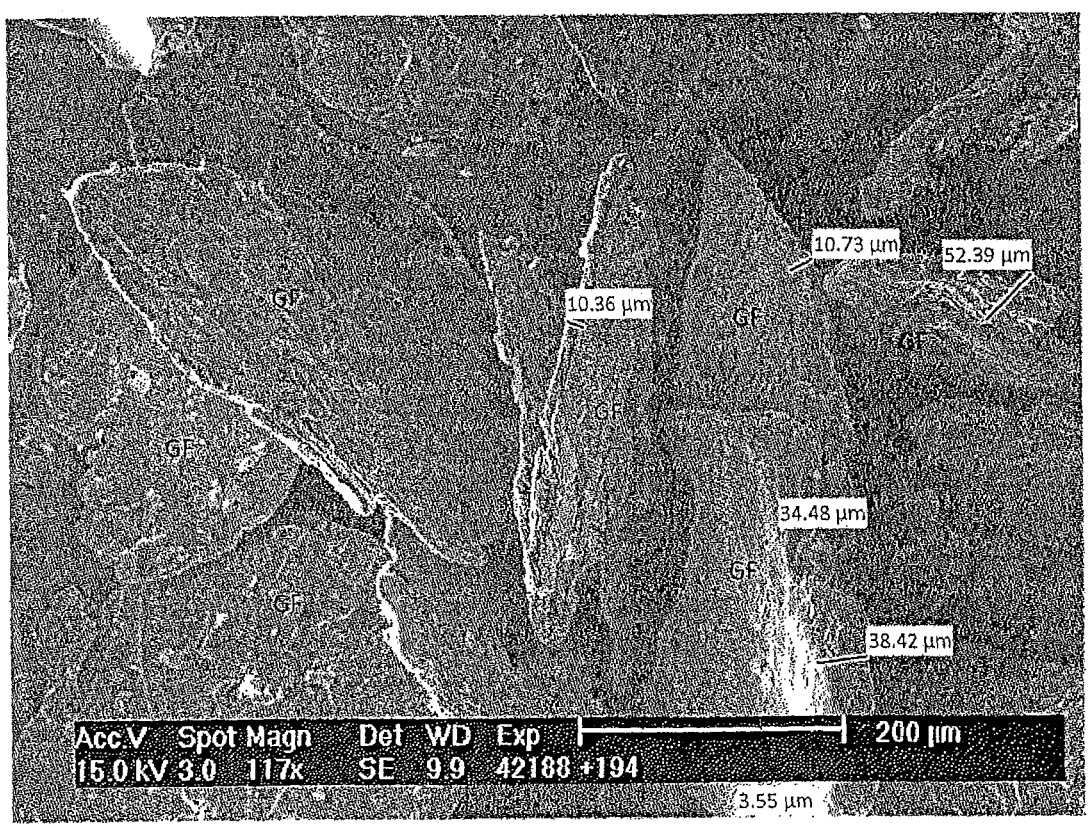

(52) U.S. Cl.
CPC .......... *C04B 2235/5296* (2013.01); *C04B 2235/5472* (2013.01); *C04B 2235/77* (2013.01); *C04B 2235/9607* (2013.01)

(58) Field of Classification Search
USPC .................................................. 501/99–101
See application file for complete search history.

(56) References Cited

U.S. PATENT DOCUMENTS

| | | |
|---|---|---|
| 8,084,122 B2 | 12/2011 | Morikawa et al. |
| 2013/0034709 A1 | 2/2013 | Takahashi et al. |

FOREIGN PATENT DOCUMENTS

| | | |
|---|---|---|
| JP | 2011-213519 A | 10/2011 |
| JP | 2012-077286 A | 4/2012 |
| RU | 1531398 A1 | 1/1993 |
| RU | 2 148 049 C1 | 4/2000 |
| RU | 2 463 277 C2 | 10/2012 |
| WO | 2011/125536 A1 | 10/2011 |

OTHER PUBLICATIONS

DIN ISO 565, Test sieves, Metal wire cloth, perforated metal plate and electroformed sheet—Nominal sizes of openings, Dec. 1998, 7 pages.

International Search Report of PCT/EP2014/058854, dated Jul. 21, 2014.

Sakaguchi Masayuki et al.: Effect of Graphite Particle Size on Properties of MgO-C-Bricks, Taikabutsu Overseas vol. 13 [1] (1993), pp. 27-29.

ASTM E112-13, Standard Test Methods for Determining Average Grain Size, pp. 1-28, Feb. 2014.

DIN EN 993-19, Prüfverfahren für dichte geformte feuerfeste Erzeugnisse, Jul. 2002, 13 pages.

ASTM E11-81, Standard Specification for Wire-Cloth Sieves for Testing Purposes, Jan. 1983, pp. 11-16.

DIN ISO 565, Metalldrahtgewebe, Lochplatten und elektrogeformte Siebfolien, Dec. 1998, pp. 1-5.

Russian Search Report dated Jun. 15, 2017 in RU 2015144336.

* cited by examiner

FIREPROOF PRODUCT CONTAINING GRAPHITE, METHOD FOR PRODUCING SAID PRODUCT, AND USE OF SAID PRODUCT

CROSS REFERENCE TO RELATED APPLICATIONS

This application is the National Stage of PCT/EP2014/058854 filed on Apr. 30, 2014, which claims priority under 35 U.S.C. §119 of German Application No. 10 2013 008 855.0 filed on May 23, 2013, the disclosure of which is incorporated by reference. The international application under PCT article 21(2) was not published in English.

The invention relates to a molded, ceramically fired or unfired, fireproof product containing graphite, particularly containing natural graphite, to a method for its production, and to its use.

Molded, fired or unfired fireproof products containing graphite generally contain natural flake graphite. In this regard, a distinction is made between products that contain graphite and are based on non-basic material granulates such as refractory clay, graphite material granulates, $Al_2O_3$—C material granulates, $ZrO_2$—C material granulates, and products that contain graphite and are based on basic material granulates such as MgO or AMC. The granulates of the molded fireproof products are solidified to form a composite, by way of known binders and/or ceramic binding.

Alumina magnesia carbon bricks (AMC bricks) that contain graphite and form spinel, having graphite contents of up to 25 wt.-%, for example, are common. Magnesia carbon bricks (MgO—C bricks) that contain graphite and are carbon-bound, having graphite contents of up to 25 wt.-%, for example, are also common.

Flake graphite, which is usually used in fireproof products that contain graphite (hereinafter also referred to only as graphite) imparts to the fireproof products, for example, reduction of wear that occurs as the result of slag infiltration, for example, improvement of the temperature change resistance by increasing the heat conductivity and lowering the reversible thermal expansion at changing temperatures (temperature increases and temperature reductions), and acts as a pressing aid when pressing the molded fireproof products.

Graphite has a hexagonal structure and consists of a sequence of different layers, called graphene layers, which spread out in an ab plane, and are disposed one on top of the other in the c direction, and, in this regard, are held together only by weak van der Waals' interactions.

The density of the graphite varies greatly as a function of the origin (deposit) and degree of comminution. Due to the layer structure, some properties of graphite are greatly direction-dependent, such as electrical conductivity, thermal conductivity, and mechanical properties.

A particular disadvantage of graphite is its low oxidation resistance. It increases with an increasing crystallinity of the carbon material.

Natural graphite, specifically generally having grain sizes between >200 µm and <500 µm, for example, and carbon contents between 85 and 99 wt.-%, for example, is predominantly used in fireproof products containing graphite, such as, for example, MgO—C bricks containing graphite. Natural products are different, depending on the deposit they come from, particularly with regard to their raw material quality such as purity and crystal size. Crystal sizes and grain size distribution, among others, are considered to be quality criteria.

When reversible thermal expansion is discussed hereinafter, the thermal expansion coefficient α, which characterizes reversible thermal expansion, is equally meant. What is not meant is irreversible expansion and irreversible shrinkage, but rather expansion caused by a temperature increase, which recedes to the same degree again when the temperature is lowered.

The different fireproof materials demonstrate different reversible thermal expansions in a temperature range to which they are subjected in situ, i.e. in a fireproof lining of an industrial unit.

In many application cases of molded fireproof products composed of fireproof material granulates, in which the fireproof product is subjected to high temperatures and frequent temperature changes, for example in an industrial unit such as a converter or a pan or an electric furnace, high reversible thermal expansion or a high thermal expansion coefficient is disruptive, because structural stresses are caused by this and can lead to divisions and crack formations, which at least require repair of the lining.

For example, it is known that magnesia bricks (MgO bricks), in comparison with magnesia carbon bricks (MgO—C bricks), demonstrate relatively high reversible thermal expansion, and that the reversible thermal expansion of MgO—C bricks turns out to be lower, the more graphite is contained in them. This is due to the far lower reversible thermal expansion of the graphite in comparison with the reversible thermal expansion of the MgO. Nevertheless, the reversible thermal expansion even of MgO bricks is still so high that expansion joints have to be provided in fireproof linings, for example in a pan, which joints are filled with material that can burn off, for example with what is called expansion joint paperboard, during the production of the fireproof lining.

It is also known that the mechanical properties of MgO—C bricks are dependent on the graphite content. For example, the relative density has a maximum at 15 vol.-% graphite. The strength values, the modulus of elasticity, and the fracture toughness demonstrate a maximum at about 5 vol.-% graphite. On the other hand, the reversible thermal expansion decreases with an increasing graphite content. In this regard, optimization of properties is not unproblematic.

Finally, it has been reported that the graphite flake size has an influence on the reversible thermal expansion, wherein this thermal expansion decreases with a decreasing graphite flake size (Sakaguchi Masayuki et al.: Effect of Graphite Particle Size On Properties Of MgO—C-Bricks, Taikabutsu Overseas Vol. 13 [1] (1993), pages 27-29). The influence of graphite in MgO—C bricks as described above occurs also in molded fireproof products made from other basic or non-basic fireproof material granulates.

It is the task of the invention to control the reversible thermal expansion or the thermal expansion coefficient (TEC) of fireproof molded products containing graphite, while maintaining the same amount of graphite in the product, particularly to lower it, and to thereby improve the temperature change resistance, wherein this intended change in properties is not supposed to lead to changes, particularly worsening of the further original material properties, such as strength values and corrosion resistance.

This task is accomplished by a homogeneous graphite mixture, particularly flake graphite mixture, composed of at least two flake graphites, for example, which are different with regard to a grain size parameter, particularly of natural origin, wherein the reversible thermal expansion of the graphite mixture results from the difference of the grain size parameters of the two graphites that correlate with the reversible thermal expansion. In this regard, the at least two graphites are selected on the basis of a form factor, in each instance, which has been previously determined for the respective graphite—also referred to hereinafter as a graphite type.

Within the scope of the invention, it was possible to determine that the maximal or average grain size that is determined or other specific grain sizes of a graphite type are not suitable for correlating with the reversible thermal expansion, so that the reversible thermal expansion of the mixture cannot be easily controlled with a mixture of at least two graphite types having different grain sizes. It has been shown that not just any more fine-particulate or coarser graphite type influences the reversible thermal expansion of another graphite type in equal manner, because the reversible thermal expansion of the graphite also does not exclusively correlate with its fineness.

Surprisingly, it was found that a determinable form factor of a graphite type, in each instance, correlates with its reversible thermal expansion. The form factor is calculated from a specific grain size determined by means of a screen analysis, and an average value c calculated from an optical measurement of the thickness of a plurality of flakes of the flake graphite type. The number of flakes to be measured in this regard results from statistical default values, for example, which are known to a person skilled in the art and can be derived from the standard ASTM E112, for example.

The form factor FF is thereby calculated from the following formula:

$$FF = \frac{\text{Grain size in } \mu\text{m of a specific amount of graphite,}}{\text{which passes through a specific screen } (d_x \text{ value})}$$
$$\overline{\text{averaged thickness } c \text{ in } \mu\text{m from an optical measurement}}$$
$$\text{of at least one scanning-electron-microscope image (SEM image)}$$

For example, for a first graphite type, the screen at which 90 wt.-% of the graphite type pass through the screen ($d_{90}$ value) is determined by means of screening. This $d_{90}$ value yields a grain size of 200 µm, for example. By means of an optical evaluation of at least one SEM image of the graphite type, the average thickness c (the average value) is determined by means of measuring the thickness of a plurality of flakes, at 10 µm, for example. This yields the following value for the form factor FF of this first graphite type at $$FF = \frac{d_{90} \text{ value } [\mu\text{m}]}{c \; [\mu\text{m}]} = \frac{200}{10} = 20$$

If a higher value for the form factor is determined for a second graphite type, from its $d_{90}$ value and averaged thickness c, then the reversible thermal expansion of the first graphite type can be lowered, to a greater or lesser extent, with this graphite type, by mixing it with the first graphite type, depending on the amount added in the mixture.

This is because it was possible for the first time, within the scope of the invention, to determine that the reversible thermal expansion of a graphite type correlates with its form factor, in that relatively high reversible thermal expansion is present at a relatively low form factor of a graphite type, and relatively low thermal expansion is present at a relatively high form factor of a graphite type.

It is practical if the difference between two form factors in a mixture of graphite types amounts to at least 10, particularly at least 50, preferably at least 80.

The amount of the other graphite type mixed in, the added graphite-type, is directed according to the amount of the desired reduction of the reversible thermal expansion of the graphite type to be changed, which is without noteworthy influence on other properties of the respective fireproof product containing a specific amount of graphite, in which, according to the invention, a graphite mixture is now contained, which has reduced reversible thermal expansion in accordance with the amount of the graphite type that was added. The amount of the added graphite type amounts, for example, to maximally 50 wt.-% and minimally 3 wt.-% added to the mixture, and is not dependent on the reversible thermal expansion of the fireproof product that is influenced by the addition of graphite mixture, because lowering of the reversible thermal expansion of the fireproof product is based solely on the reversible thermal expansion of the graphite mixture.

The following illustrates the non-usability of screen passage values $d_x$ alone. A graphite type available on the market had a $d_{90}$ value of 30 µm and a c value of 0.4 µm. Another graphite type had a $d_{90}$ value of 154 µm and a c value of 2.0 µm. For the two graphite types, form factors of 75 and 77, which lie close to one another, were calculated, i.e. the two graphite types have the same effects with regard to the form factor of 20 calculated above, although the $d_{90}$ values and the c values lie far apart from one another.

Figure 2:
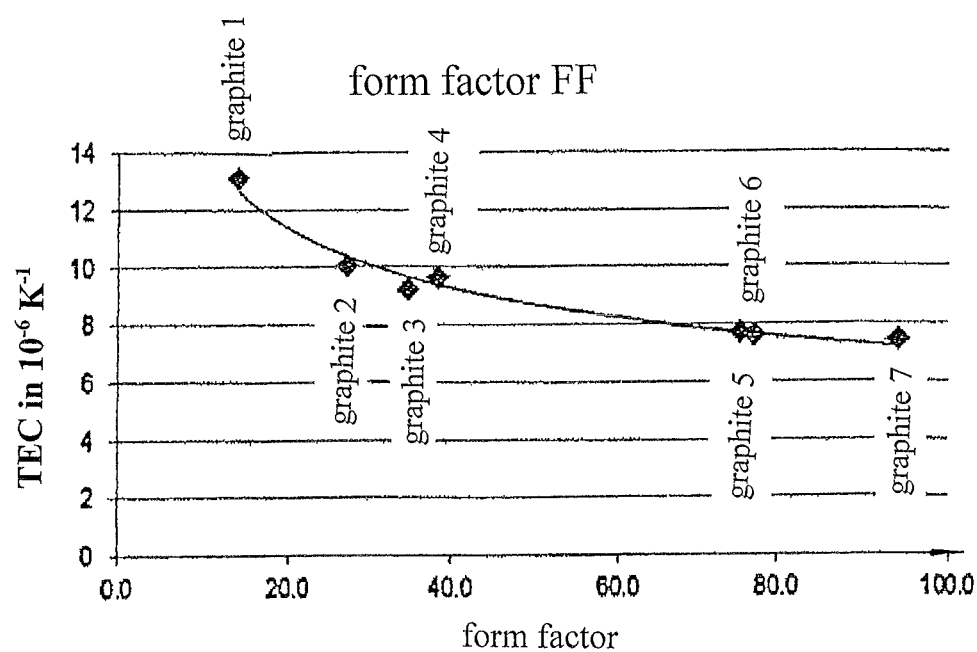

Using the drawing, the invention will be explained in greater detail below, as an example. The drawing shows:

FIG. 1 a raster-electron-microscope image (SEM image) of a flake graphite type available on the market, with information concerning some optically measured flake thicknesses;

FIG. 2 a graphic representation of the correlation between the thermal expansion coefficient and the form factor of different graphite types, at the respective $d_{90}$ value.

The reversible thermal expansion or the thermal expansion coefficient of a graphite powder type is determined, for example, in that a graphite sample body pressed in cold isostatic manner is produced, and then the thermal expansion is measured.

For this purpose, a mixture of the graphite with a novolac powder resin plus resin hardener, for example hexamethylenetetramine, is produced, specifically from 95 mass-% graphite and 5 mass-% resin including 10 mass-% hardener, with reference to the resin. Mixing takes place in an intensive mixer (e.g. Eirich countercurrent mixer; 4 min at 1500 rpm). Afterward, the raw mixture is filled into a latex mold, the mold is closed with a plug having a valve, and the filled-in raw mixture is evacuated by means of a vacuum pump. Subsequently, cold isostatic pressing takes place, followed by hardening of the molded body for 2 h at 200° C. Subsequently, a cylinder is drilled out of the hardened molded body, and sawed off with the dimensions d=40 mm; h=50 mm.

To determine the thermal expansion of the graphite sample body, the graphite cylinder is introduced into a measurement capsule, which is filled with petroleum coke for protection against burning off of the carbon, and a hood oven from the Netzsch company, for example, is used to measure the thermal expansion. The prepared measurement capsule is installed into the hood oven and a top load of 0.02 MPa is applied, and the sample body is heated up to 1500° C. In this regard, the thermal expansion is determined using a plotted expansion curve. The calculation of the thermal expansion coefficient α then takes place from the increase in the expansion curve as a function of the temperature, determined by analogy to DIN-EN 993-19.

The SEM image (FIG. 1) shows multiple graphite flakes of a flake graphite type that is available on the market, some of which flakes are labeled with "GF." Furthermore, in the case of multiple graphite flakes, the thickness, determined optically analogous to ASTM E 112, is also indicated, wherein the measured location is marked with a line. The scale of the SEM image is indicated at 200 μm at the foot of the image. An average thickness c rounded up to 25 μm results from the thickness measurements. The screen analysis of this graphite type yielded a $d_{90}$ value of 400 μm, and a form factor of FF =16 results from this.

Another flake graphite type available on the market was analyzed in the same manner and yielded a form factor of FF=94.

A mixture of 80 wt.-% of the first flake graphite type and 20 wt.-% of the second flake graphite type yielded a TEC of $10.2 \times 10^{-6}$ $K^{-1}$. A mixture of 90 wt.-% of the first flake graphite type and 10 wt.-% of the second flake graphite type yielded a TEC of $11.9 \times 10^{-6}$ $k^{-1}$. A mixture of 70 wt.-% of the first flake graphite type and 30 wt.-% of the second flake graphite type yielded a TEC of $8.5 \times 10^{-6}$ $K^{-1}$.

This example makes it clear that the thermal expansion coefficient and thereby the reversible thermal expansion of a graphite type can be changed, in targeted manner, by way of the form factor FF.

FIG. 2 shows the correlation of the thermal expansion coefficient of different flake graphite types with the form factor of the graphite types, wherein the values are situated on a connecting line that is only bent slightly. The correlation with the $d_{90}$ values of the flake graphite types is shown. Similar correlation lines, which are also usable for purposes of the invention, result from other $d_x$ values, up to $d_{50}$ values, for example, or x values above 90. The higher this pass-through value lies, the more precise the correlation. It is therefore practical for the $d_x$ value to lie between $d_{50}$ and $d_{95}$.

It is practical to use the same x value for the flake graphite types to be analyzed, for example the $d_{90}$ value (x=90) for the available flake graphite types, and to select the added graphite type or the added graphite types with which the thermal expansion coefficient of a graphite type primarily used can be clearly controlled by means of mixing in an added graphite type, using the calculated form factor.

Screening according to ASTM E11-81 or ISO 565 is practical.

The method according to the invention, for controlling the reversible thermal expansion, can be particularly effectively used for pure graphite products, particularly pure fireproof graphite products, which consist mainly of graphite, such as crucibles, graphite blocks, as well as other graphite components, because flake graphites having a clearly changeable reversible thermal expansion can be produced by means of mixing, according to the invention, of at least two different flake graphite types, for example coming from different deposits. This makes sense, for example, if only the reversible thermal expansion of the one graphite type is supposed to be changed, and the other original properties of the graphite product are supposed to be maintained.

An application of the targeted and effective change of the reversible thermal expansion of a graphite type, according to the invention, by means of mixing in another flake graphite type that has been found to be suitable for this, by way of the form factor, is possible for all known fireproof products containing graphite and other graphite products. In all fireproof products containing graphite, the graphite influences the reversible thermal expansion fundamentally because of its different reversible thermal expansion in comparison with the thermal expansion of the fireproof material. Furthermore, there is a dependence on the amount of graphite in the fireproof product, wherein, however, different amounts of graphite not only cause different reversible thermal expansions, but also change other significant properties such as cold pressure resistance, cold bending resistance, modulus of elasticity, and temperature change resistance. The present invention provides a remedy, in that now, graphite mixtures that merely change the reversible thermal resistance, but do not change the other properties to a noteworthy or significant extent, can be used as a graphite additive, in the same amount.

In the following, the action of graphite type mixtures on the thermal expansion coefficient will be illustrated for MgO—C bricks, as representatives for other fireproof products containing graphite, using an example.

EXAMPLE

MgO—C bricks having a composition according to Table 1 were produced as usual, wherein the standard graphite 1 was replaced with 20 wt.-% of the graphite type 7 of the graphites indicated in FIG. 2. The proportions in the following Table 1 are weight percent.

TABLE 1

| Composition of the MgO—C bricks | | |
|---|---|---|
| Raw material | | Proportion [%] |
| Grain fractions [mm] | | |
| Fused MgO 97 | 2-4 | 34.00 |
| Fused MgO 97 | 1-2 | 22.00 |
| Fused MgO 97 | 0-1 | 20.00 |
| Fused MgO 97 | Meal | 14.00 |
| Graphite 1 | | 8.00 |
| Graphite 7 | | 2.00 |
| Amount % | | |
| Phenolic resin | | 3.00 |

The results are shown in the following Table 2. It turned out, as is evident in Table 2, that it was possible to lower the thermal expansion coefficient α from 8.82 to 7.20. Measurement of the thermal expansion was carried out by analogy to DIN-EN 993-19.

TABLE 2

| Properties of the MgO bricks | | |
|---|---|---|
| | Standard with graphite 1 | MgO—C bricks with reduced thermal expansion |
| Cold pressure resistance in MPa | 31.9 | 34.6 |
| OP in % | 10.79 | 10.38 |
| $\rho_R$ in g/cm$^3$ | 2.94 | 2.97 |
| α in $10^{-6}$ $K^{-1}$ | 8.72 | 7.20 |

It lies within the scope of the invention to evaluate at least one SEM image of a flake graphite type in place of the $d_x$ value of a screening, in that the graphene length a and the graphene width b of a statistically sufficient number of flakes are measured optically, for example according to ASTM E112, and these values are averaged, in each instance, and the term $\sqrt{a^2+b^2}$ is calculated as the $d_x$ value from the averaged values for a and b. This value is divided by the averaged thickness c of the graphite flakes of this graphite type, which is also determined from the SEM image, in the same manner. A form factor FF results from this, which correlates with the thermal expansion coefficient or with the reversible thermal expansion in the same manner as the form factor FF that is calculated with a $d_x$ value. It also lies within the scope of the invention to use at least one synthetic graphite type, particularly as an added graphite type.

A product according to the invention is particularly advantageous if the product has a homogeneous mixture of at least two graphite types, each having a different thermal expansion coefficient, wherein one graphite type predominates, in terms of amount, and the other graphite type functions as an added graphite type, the graphite types differ in a form factor FF, which correlates with their thermal expansion coefficients, wherein the form factor FF results, in each instance, from a division of a screening machine width in pm, through which a specific percentage amount x of graphite flakes of this graphite type passes ($d_x$ value), by a thickness c of flakes of the graphite type that are visible in a SEM image, the thickness being determined optically from at least one SEM image and averaged arithmetically, wherein a small form factor FF correlates with a high thermal expansion coefficient and a greater form factor FF correlates with a smaller thermal expansion coefficient, the form factor FF of suitable natural graphite types lies between 5 and 200, particularly between 10 and 100, x of the $d_x$ value lies between 50 and 95, particularly between 60 and 90, preferably is 90, the difference of the form factors FF (Δ FF) of the graphite types of the graphite type mixture amounts to at least 10, particularly at least 50, and preferably 85, the amount of the added graphite type having the greater form factor FF, for example, added to the graphite type having the smaller form factor FF, amounts to maximally 50 wt.-% and particularly lies between 5 and 30 wt.-%, the fireproof material granulate has at least one material of the following group: MgO, $Al_2O_3$, $SiO_2$, $ZrO_2$, CaO, $Cr_2O_3$, but is preferably MgO.

A particularly advantageous method for reducing the reversible thermal expansion of a molded fireproof product containing graphite, particularly containing natural graphite, on the basis of fireproof material granulates, is present if the granulate grains of the material granulates are solidified to form a molded body, using a known binder and/or ceramic binding, and a mixture of at least two graphite types having different thermal expansion coefficients, in each instance, has been used, wherein one graphite type predominates, in terms of amount, and the other graphite type functions as an added graphite type, the graphite types differ in a form factor FF that correlates with their thermal expansion coefficient, wherein the one graphite type has a lower form factor FF and makes up the predominant component of the graphite mixture, and the other graphite type has a higher form factor FF, or vice versa, depending on which thermal expansion coefficient is supposed to be changed, and wherein the form factor FF of each graphite type is determined before mixing, each form factor FF is determined as follows: screening of the graphite type and determination of the mesh width in μm of a screen that allows a specific percentage amount x in wt.-% to pass through ($d_x$ value), determination of the averaged thickness c determined from a statistically sufficient number of measurements of graphite flakes, using an optical method, from at least one SEM image of the respective graphite type, calculation of the form factor FF using the formula:

$$FF = \frac{d_x \text{ value}}{c}$$

graphite types having form factors FF of at least 10, particularly of at least 50, and preferably of at least 100 are used for the production of graphite mixtures, the mesh width is determined using x values between 50 and 95, particularly between 60 and 90, preferably using 90, graphite types are used for a graphite mixture, with the difference between their form factors FF (Δ FF) amounting to at least 3 and maximally 50, and particularly lying between 50 and 30, the amount of the added graphite type having the greater form factor FF added to the graphite type having the smaller form factor FF, or vice versa, depending on which thermal expansion coefficient is supposed to be changed, amounts to minimally 3 and maximally 50 wt.-%, and particularly lies between 5 and 30 wt.-%, for the fireproof material granulates, at least one fireproof material from the following group is used: MgO, $Al_2O_3$, $SiO_2$, $Zr_2O_3$, CaO, $Cr_2O_3$, but preferably MgO is used.

The invention claimed is:

1. Molded fireproof product containing graphite on the basis of fireproof material granulates, the granulate grains of which are solidified to form a molded body using binders and/or ceramic binding, wherein the product has a homogeneous mixture of at least two graphite types, each having a different thermal expansion coefficient, wherein one graphite type predominates, in terms of amount, and the other graphite type functions as an added graphite type, wherein the graphite types differ in a form factor FF, which correlates with their thermal expansion coefficients, wherein the form factor FF results, in each instance, from a division of a $d_x$ value by a thickness c in μm of flakes of the graphite type that are visible in a SEM image, the thickness being determined optically from at least one SEM image and averaged arithmetically, wherein the $d_x$ value represents a screening mesh width in μm of a screen that allows a specific wt.-percentage amount x of graphite flakes of this graphite type to pass through, wherein a small form factor FF correlates with a high thermal expansion coefficient and a greater form factor FF correlates with a smaller thermal expansion coefficient, wherein x of the $d_x$ value lies between 50 and 95, wherein the same value of the specific wt.-percentage x is used for determining the respective form factor FF of each graphite type of the graphite type mixture, and wherein the difference of the form factors FF (Δ FF) of the graphite types of the graphite type mixture amounts to at least 10.

2. Product according to claim 1, wherein the form factor FF of suitable natural graphite types lies between 5 and 200.

3. Product according to claim 1, wherein the amount of the added graphite type having the greater form factor FF amounts to maximally 50 wt.-%.

4. Product according to claim 1, wherein the fireproof material granulate has at least one material of the following group: $MgO$, $Al_2O_3$, $SiO_2$, $ZrO_2$, $CaO$, $Cr_2O_3$.

5. Method for reducing the reversible thermal expansion of a fireproof molded product containing graphite on the basis of fireproof material granulates, wherein the granulate grains of the material granulates are solidified to form a molded body, using a binder and/or ceramic binding, and wherein a mixture of at least one fireproof material, at least one binder, and a specific amount of graphite is produced and molded,
wherein as the graphite, a mixture of at least two graphite types that differ in terms of the thermal expansion coefficient is used, wherein one graphite type predominates, in terms of amount, in the graphite mixture, and the other graphite type functions as an added graphite type,
wherein the graphite types differ in a form factor FF that correlates with their thermal expansion coefficient, wherein the one graphite type has a lower form factor FF and makes up the predominant component of the graphite mixture, and the other graphite type has a higher form factor FF, or vice versa, depending on which thermal expansion coefficient is supposed to be changed, and wherein the form factor FF of each graphite type is determined before mixing,
wherein each form factor FF is determined as follows:
screening of the graphite type and determination of a $d_x$ value, wherein the $d_x$ value represents a screening mesh width in pm of a screen that allows a specific wt.-percentage amount x of graphite flakes of this graphite type to pass through,
determination of the averaged thickness c in µm determined from a statistically sufficient number of measurements of graphite flakes, using an optical method, from at least one SEM image of the respective graphite type,
calculation of the form factor FF using the formula:

$$FF = \frac{d_x \text{ value}}{c},$$

and
wherein x of the $d_x$ value lies between 50 and 95,
wherein the respective form factor FF of each graphite type of the graphite type mixture is determined using the same value, of the specific wt.-percentage, and
wherein graphite types are used for a graphite mixture, with the difference between their form factors FF (Δ FF) amounting to at least 10.

6. Method according to claim 5, wherein graphite types having form factors FF of at least 10 are used for the production of graphite mixtures.

7. Method according to claim 5, wherein graphite types are used for a graphite mixture, with the difference between their form factors FF (Δ FF) amounting to maximally 50.

8. Method according to claim 5, wherein the amount of the added graphite type having the greater form factor FF added to the graphite type having the smaller form factor FF, or vice versa, depending on which thermal expansion coefficient is supposed to be changed, amounts to minimally 3 and maximally 50 wt.-%.

9. Method according to claim 5, wherein for the fireproof material granulates, at least one fireproof material from the following group is used: $MgO$, $Al_2O_3$, $SiO_2$, $Zr_2O_3$, $CaO$, $Cr_2O_3$.

10. Product according to claim 1, wherein the graphite is natural graphite.

11. Product according to claim 2, wherein the form factor lies between 10 and 100.

12. Product according to claim 1, wherein the x of the $d_x$ value lies between 60 and 90.

13. Product according to claim 1, wherein the x of the $d_x$ value is 90.

14. Product according to claim 1, wherein the difference of the form factors FF (Δ FF) of the graphite types of the graphite type mixture amounts to at least 50.

15. Product according to claim 1, wherein the difference of the form factors FF (Δ FF) of the graphite types of the graphite type mixture amounts to at least 85.

16. Product according to claim 1, wherein the amount of the added graphite type added to the graphite type having the smaller form factor FF lies between 5 and 30 wt.-%.

17. Product according to claim 4, wherein the fireproof material granulate is MgO.

18. Method according to claim 5, wherein the graphite is natural graphite.

19. Method according to claim 6, wherein graphite types having form factors of at least 50 are used for the production of the graphite mixtures.

20. Method according to claim 6, wherein graphite types having form factors of at least 100 are used for the production of the graphite mixtures.

21. Method according to claim 5, wherein x values between 60 and 90 are used to determine the mesh width.

22. Method according to claim 5, wherein 90 is used as the x value to determine the mesh width.

23. Method according to claim 7, wherein the difference between the form factors FF (Δ FF) of the graphite types used for the graphite mixture lies between 10 and 30.

24. Method according to claim 8, wherein the amount of the added graphite type lies between 3 and 30 wt.-%.

25. Method according to claim 9, wherein the fireproof material used is MgO.

* * * * *

UNITED STATES PATENT AND TRADEMARK OFFICE
CERTIFICATE OF CORRECTION

PATENT NO. : 9,862,645 B2
APPLICATION NO. : 14/892669
DATED : January 9, 2018
INVENTOR(S) : Jansen et al.

Page 1 of 1

It is certified that error appears in the above-identified patent and that said Letters Patent is hereby corrected as shown below:

In Column 7, Line 21, after the word "in" please change "pm" to correctly read: "μm".

In Column 9, Line 34 (Line 27 of Claim 5) after the word "in" please change "pm" to correctly read: "μm".

Signed and Sealed this
Twenty-fourth Day of April, 2018

Andrei Iancu
*Director of the United States Patent and Trademark Office*